UNITED STATES PATENT OFFICE.

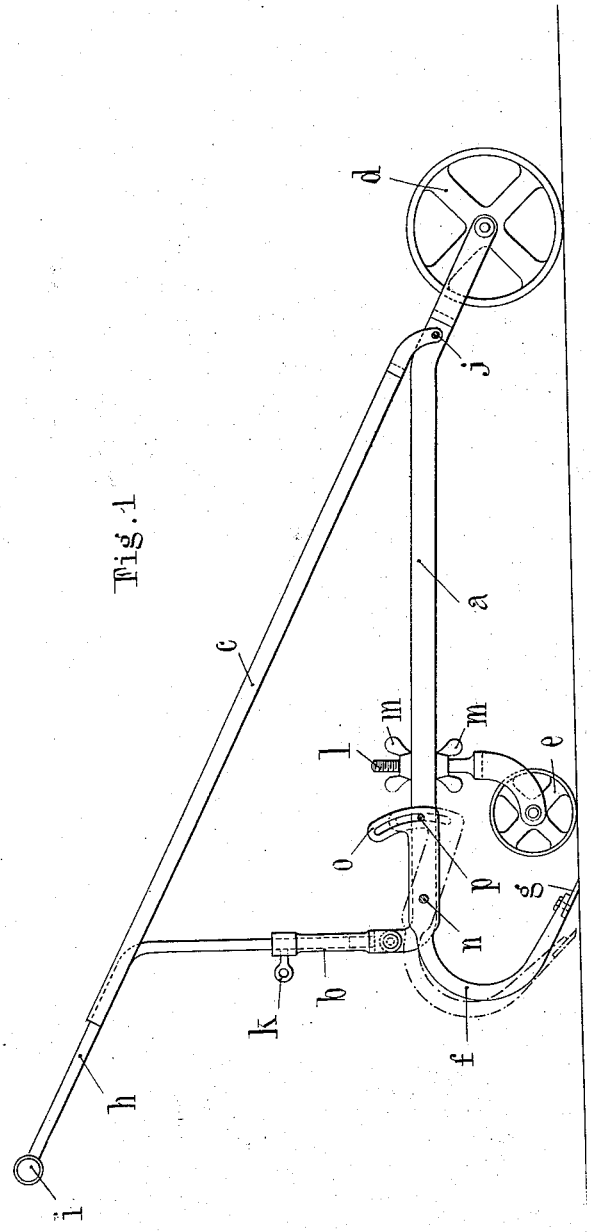
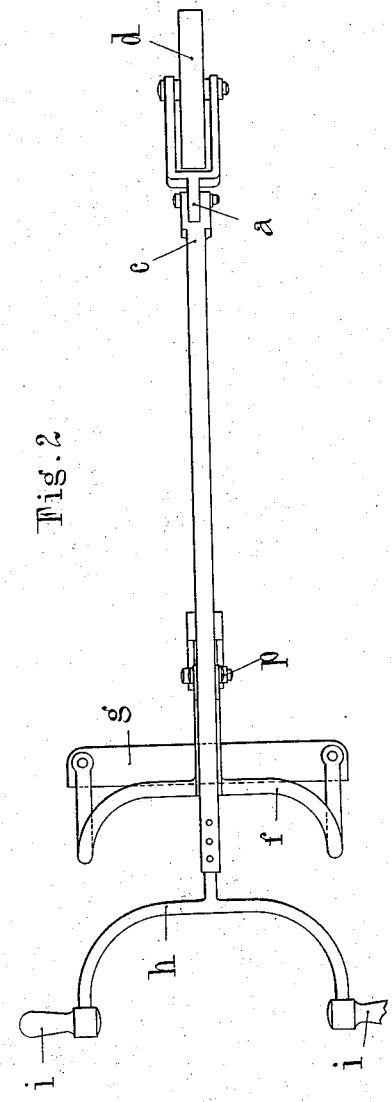

DOMINIQUE JAMES EUGÈNE CONTI, OF ROANNE, FRANCE.

WEED-CUTTER OR CULTIVATOR.

1,157,150.  Specification of Letters Patent.  Patented Oct. 19, 1915.

Application filed September 20, 1912.  Serial No. 721,455.

*To all whom it may concern:*

Be it known that I, DOMINIQUE JAMES EUGÈNE CONTI, a citizen of the French Republic, residing at Roanne, Loire, France, have invented certain new and useful Improvements in Weed-Cutters or Cultivators, of which the following is a specification.

This invention relates to a hand-operated machine of simple and light construction for weeding, raking and like operations.

The machine can be employed for example, 1st, for weeding and hoeing vines and nurseries; 2nd, for weeding and raking walks in parks and gardens; 3rd, for weeding pot herbs and all vegetables or plants sown or planted in rows with small spaces between them such as cabbages, potatoes, artichokes, asparagus, beetroot and tobacco plants.

In the accompanying drawings, Figure 1 is a side elevation of the improved machine, and Fig. 2 a plan of the same.

The apparatus comprises a frame of triangular form in elevation, consisting of a longitudinal base member or beam $a$, an upright $b$ and a tie bar $c$ connecting the forward end of the base member $a$ with the upright $b$. The frame is mounted on two wheels $d$ and $e$ placed one behind the other in the plane of the frame. A tool carrier $f$ is pivoted on the rear end of the frame, and is shown fitted with a blade $g$. A handle bar $h$ and operating handles $i$ are provided on the rear end of the machine frame as shown. The longitudinal base member $a$ and the tie bar $c$ are connected with one another at the point $j$. The handle bar $h$ and the operating handles $i$ are firmly connected with the tie bar $c$. The height of the handles above the ground is regulated by the upright $b$ which is made telescopic and fixed after adjustment by a set screw $k$, or the adjustment may be effected by a sleeve with right and left screw thread or by any other means.

The leading wheel $d$ placed in front of the frame is simply a running wheel. The trailing wheel $e$ is placed near the blade, and is likewise a running wheel, but serves in addition for regulating the extent to which the blade enters the ground. For this purpose the shank $l$ of the wheel supporting fork is screw threaded and fixed on the longitudinal member $a$ between two winged nuts $m$. Any other vertical regulating device may be employed without involving any change in the principle of the invention.

The blade holder $f$ is connected at the point $n$ with the longitudinal member $a$. By turning it around the point the inclination of the blade in relation to the ground is regulated. The blade holder carries a slotted sector $o$ through which a clamping bolt $p$ is passed for clamping the blade holder after adjustment to the beam $a$. The blade holder may receive various implements, blades, multiple shares, harrows, rakes, etc.

Stability is insured by the apparatus having a first line of support in the direction of travel, which consists in the two wheels and a second line of support arranged in the perpendicular direction and consisting in the blade itself.

The man who guides the apparatus should not have the handles in front but on each side of him. In order that this may be possible the handle bar is bent and open toward the back so as to form a place for the body.

With this hand-operated apparatus any person can rake or weed 350 to 450 square meters per hour according to the composition of the soil, that is to say do in an hour a days work performed by a man with the ordinary rakes hitherto known. These figures have been proved by long and careful trials. They show the following advantages: 1st, saving of hand labor; 2nd, saving of time; 3rd, more uniform and better work.

The weeding and raking apparatus does not work violently, it acts everywhere and does not leave a single weed. The weeding and raking apparatus is exceedingly easy and exceedingly simple to work, it can be used by a fifteen year old boy or girl. The extent to which the blade enters the ground is regulated according to the work which it is desired to perform. For this purpose it is only necessary to adjust, 1st, the wheel $e$ which it may be desired to raise or lower according to the depth of cut desired; 2nd, the inclination of the blade $g$ by means of the sector $o$. This inclination is left to the judgment of the operator. It differs according to the work and the nature of the soil; 3rd, the height of the handles $i$ by means of the sleeve $b$.

The apparatus having been thus regulated it is taken by the handles $i$ and moved forward by being pressed without bearing too much on it, a condition essential for working quickly and without fatigue.

What I claim is:

1. A weed cutter or cultivator comprising a triangular frame supported on a front and a rear wheel, said wheels being arranged in the longitudinal plane of the frame and in line with each other, said frame comprising a longitudinal base member, a vertically adjustable upright at the rear end of the said base member consisting of two parts telescopically arranged, an inclined tie-bar connecting the upper end of the upper part of the upright with the forward end of the base member, the front end of said tie-bar being pivoted to the base member, and a tool holder pivotally mounted on the base member of the frame at a point in rear of the rear wheel.

2. A weed cutter or cultivator comprising a frame, a front and a rear wheel for supporting said frame, said rear wheel being carried by a fork, a shank for said fork adjustably connected with the frame, and a tool-holder pivotally connected with the frame.

In testimony whereof he has affixed his signature, in presence of two witnesses.

DOMINIQUE JAMES EUGÈNE CONTI.

Witnesses:
L. MAZAUD,
EDMOND A. BURRILL.

Copies of this patent may be obtained for five cents each, by addressing the "Commissioner of Patents, Washington, D. C."